United States Patent
Huang et al.

(10) Patent No.: US 8,549,274 B2
(45) Date of Patent: Oct. 1, 2013

(54) DISTRIBUTIVE CACHE ACCESSING DEVICE AND METHOD FOR ACCELERATING TO BOOT REMOTE DISKLESS COMPUTERS

(75) Inventors: Chia-Hsin Huang, Guishan Township (TW); Chao-Jui Hsu, Guishan Township (TW); Wun-Yuan Kuo, Guishan Township (TW); Wei-Yu Chen, Guishan Township (TW); Yu-Yen Chen, Guishan Township (TW); Sia-Mor Yeoh, Guishan Township (TW)

(73) Assignee: Jade Quantum Technologies, Inc., Taoyuan County (TW)

( * ) Notice: Subject to any disclaimer, the term of this patent is extended or adjusted under 35 U.S.C. 154(b) by 677 days.

(21) Appl. No.: 12/759,745

(22) Filed: Apr. 14, 2010

(65) Prior Publication Data

US 2011/0258424 A1    Oct. 20, 2011

(51) Int. Cl.
*G06F 9/00* (2006.01)

(52) U.S. Cl.
USPC .................................. 713/2; 713/1; 709/222

(58) Field of Classification Search
USPC ........................................ 713/2, 1; 709/222
See application file for complete search history.

(56) References Cited

U.S. PATENT DOCUMENTS

| | | | | |
|---|---|---|---|---|
| 5,802,297 | A * | 9/1998 | Engquist | 709/212 |
| 7,036,040 | B2 * | 4/2006 | Nicholson et al. | 714/6.31 |
| 7,882,562 | B2 * | 2/2011 | Arroyo et al. | 726/26 |
| 7,921,240 | B2 * | 4/2011 | Zur et al. | 710/52 |
| 7,962,737 | B2 * | 6/2011 | Lo | 713/2 |
| 2004/0153694 | A1 | 8/2004 | Nicholson et al. | |
| 2005/0281280 | A1 | 12/2005 | Zur et al. | |
| 2008/0028052 | A1 * | 1/2008 | Currid et al. | 709/222 |
| 2010/0299512 | A1 * | 11/2010 | Maruyama et al. | 713/2 |

FOREIGN PATENT DOCUMENTS

| | | | |
|---|---|---|---|
| JP | 2008-3929 | * | 1/2008 |
| TW | 200913622 | | 3/2009 |
| WO | WO 2009/069326 | * | 6/2009 |

* cited by examiner

*Primary Examiner* — Chun Cao
(74) *Attorney, Agent, or Firm* — Alan Kamrath; Kamrath IP Lawfirm, P.A.

(57) ABSTRACT

A distributive cache accessing device for accelerating booting remote diskless computers mounted in a diskless computer equipped with WAN-bootable hardware, such as an iSCSI host bus adapter (HBA), allows to access data required to boot the diskless computers or run application programs thereon from an iSCSI target or other diskless computers having the distributive cache accessing device via a network. The retrieved iSCSI data blocks are temporarily stored in the local distributive cache accessing device. If any other diskless computer requests for the iSCSI data blocks, the temporarily stored iSCSI data blocks can be accessible to the diskless computer. Given installation of a large number of diskless computers, the network traffic of the iSCSI target is alleviated, and booting remote diskless computer is accelerated.

12 Claims, 4 Drawing Sheets

DISTRIBUTIVE CACHE ACCESSING DEVICE AND METHOD FOR ACCELERATING TO BOOT REMOTE DISKLESS COMPUTERS

BACKGROUND OF THE INVENTION

1. Field of the Invention

The present invention is related to a distributive cache accessing device and method and more particularly, to a device and method capable of solving a traffic jam over the server side arising from simultaneous boot-up of a large number of diskless computers over the client side, and thus reducing the booting time of diskless computers.

2. Description of the Related Art

U.S. Patent Publication No. US20040153694 "Reliability of Diskless Network Bootable Computers Using Non-Volatile Memory Cache" discloses that computers over the client side temporarily store data transmitted from a remote boot server in a non-volatile memory cache (NVM). The data can then be retrieved from the NVM cache to resume operation when the network is unavailable or slow. The cache is later synchronized with the remote boot server when network conditions improve, so that network-bootable computers have higher reliability. The data stored in the NVM cache can be also used for cold booting. However, the data must be obtained from the remote boot server before storing them to the NVM cache and is not directly accessible from other nodes of the network to achieve a load-sharing mechanism.

U.S. Patent Publication No. US20050281280 "Method and System for Supporting Hardware Acceleration for iSCSI (Internet Small Computer System Interface) Read and Write Operations and iSCSI Chimney" discloses that the iSCSI read and write operations are performed via a TCP offload engine. The mechanism pre-registers certain hardware buffers. When receiving an iSCSI command, an iSCSI initiator first analyzes its packet information and compares them with the content of the pre-registered buffers. Data can then be transmitted or zero copied from the pre-registered buffers to the iSCSI initiator. The so-called zero copy concept is when users transmit data out via network sockets, and the system copies data to a kernel buffer and then allocates the content in the kernel buffer to a user buffer. Such allocation is done by a CPU. The kernel then allocates the content of the user buffer to the socket buffer of the kernel and makes the content accessible to communication protocol engines. Such method accesses cache data through shared memory, occupies less CPU resource and memory, and enhances the performance of the read and write operations of the iSCSI initiator. However, the cache data fails to be acquired from external nodes, and thus fails to distribute network traffic and work load to external nodes to improve performance.

Taiwanese Patent Publication No. 200913622 "WAN-booting System Enhancing Booting Efficiency of Diskless Computers" discloses that an iSCSI target won't execute access disks in accordance with iSCSI commands issued by each iSCSI initiator, but compares existing data in cache memory of the iSCSI Target. If identical data is found, one disk-accessing time can be saved to enhance performance. Such method is an extension of the conventional cache accessing mechanism, and its operation concept is also similar. However, such method fails to solve the network overhead incurred in the case of unavailable accessing cache, e.g. network traffic of iSCSI target.

In sum, the read and write operations in U.S. Patent Publication No. US20040153694 rely on the iSCSI target. Thus, the load of the iSCSI target increases and fails to distribute the load of the iSCSI target to each iSCSI initiator when a large number of iSCSI initiators simultaneously request for data. By reducing the data-accessing frequency in each buffer, U.S. Patent Publication No. US20050281280 enhances the operation efficiency of the iSCSI initiators. Taiwanese patent Patent Publication No. 200913622 reduces the disk-accessing frequency by comparing the cache data in the iSCSI target to raise the operating efficiency of the iSCSI initiators. However, the issue of consuming the network bandwidth of the iSCSI target still remains. To reduce network traffic of the iSCSI target and enhance remote booting and operating performance of network diskless computers, conventional techniques can be further refined.

SUMMARY OF THE INVENTION

The first objective of the present invention is to provide a distributive cache accessing device for accelerating booting diskless computers capable of reducing network traffic over the server side.

To achieve the foregoing objectives, the distributive cache accessing device N mounted in each of a local diskless computer and a plurality of other diskless computers respectively equipped with a WAN-bootable hardware and in an iSCSI target. All the diskless computers and the iSCSI target are mutually connected through a network for accelerating to boot up the distributive cache accessing device. The distributive cache accessing device has a multi-link cache accessing pre-reading module, a cache sharing module and a pre-reading list generating and inquiring module.

The multi-link cache accessing pre-reading module acquires at least one pre-reading list from the iSCSI target, and ascertains data stored in at least one of the plurality of other diskless computers for booting the local diskless computer having the multi-link cache accessing pre-reading module and for executing application programs by multi-linking to and sending out a plurality of iSCSI commands from the local diskless computer to the at least one of the plurality of other diskless computers determined as at least one optimal data holder to request for a plurality of cache data blocks from the optimal data holder.

The cache sharing module receives the plurality of iSCSI commands from at least one of the plurality of other diskless computers for requesting the plurality of cache data blocks, and transmits the plurality of cache data blocks in the local diskless computer to the at least one remote of the plurality of other diskless computers issuing the plurality of iSCSI commands.

The pre-reading list generating and inquiring module enables the iSCSI target to record a sequence of iSCSI commands and at least one network address of at least one of the plurality of other diskless computers, and generates the at least one pre-reading list to be accessed by all the diskless computers.

The second objective of the present invention is to provide a distributive cache accessing method for accelerating to boot remote diskless computers capable of reducing network traffic over the server side.

The distributive cache accessing method is installed in a distributive cache accessing device of a local diskless computer connected with a plurality of other diskless computers and an iSCSI target via a network to execute the following steps of:

generating a iSCSI read command;

searching if the distributive cache accessing devices of the plurality of other diskless computers have data to be read by the iSCSI read command;

if positive, retrieving the data from the corresponding other diskless computers having the data;

if negative, sending the iSCSI read command to the iSCSI target to process;

retrieving the data from the iSCSI target; and storing the data in the distributive cache accessing device of the local diskless computer.

A distributive cache accessing method is installed in a distributive cache accessing device of an iSCSI target connected with at least one diskless computer via network to execute the following steps of:

receiving an iSCSI command from the at least one diskless computer;

determining if the iSCSI command is an iSCSI read command;

if the iSCSI command is an iSCSI read command, generating an OSP and a WHWL;

determining if the distributive cache accessing device of the iSCSI target has data associated with the iSCSI read command;

if the data is found, transmitting the data to the at least one diskless computer;

if the data is not found, reading the data from a storage device in the iSCSI target;

storing the data in the distributive cache accessing device of the iSCSI target;

transmitting the data back to the at least one diskless computer;

if the iSCSI command is not an iSCSI read command, determining if the iSCSI command is a pre-reading list acquiring command;

if it is the pre-reading list acquiring command, reading data of a pre-reading list;

transmitting the data back to the at least one diskless computer; and if it is not the pre-reading list acquiring command, ignoring the iSCSI command and terminating. Since the distributive cache accessing devices of the diskless computers temporarily store partial data of the iSCSI target, each diskless computer can access the data required to boot and run application programs thereon directly from other diskless computers. Consequently, the network traffic of the iSCSI target can be significantly reduced, and the booting speed and the speed of executing application programs of the diskless computers are also enhanced.

DETAILED DESCRIPTION OF THE INVENTION

Figure 1:
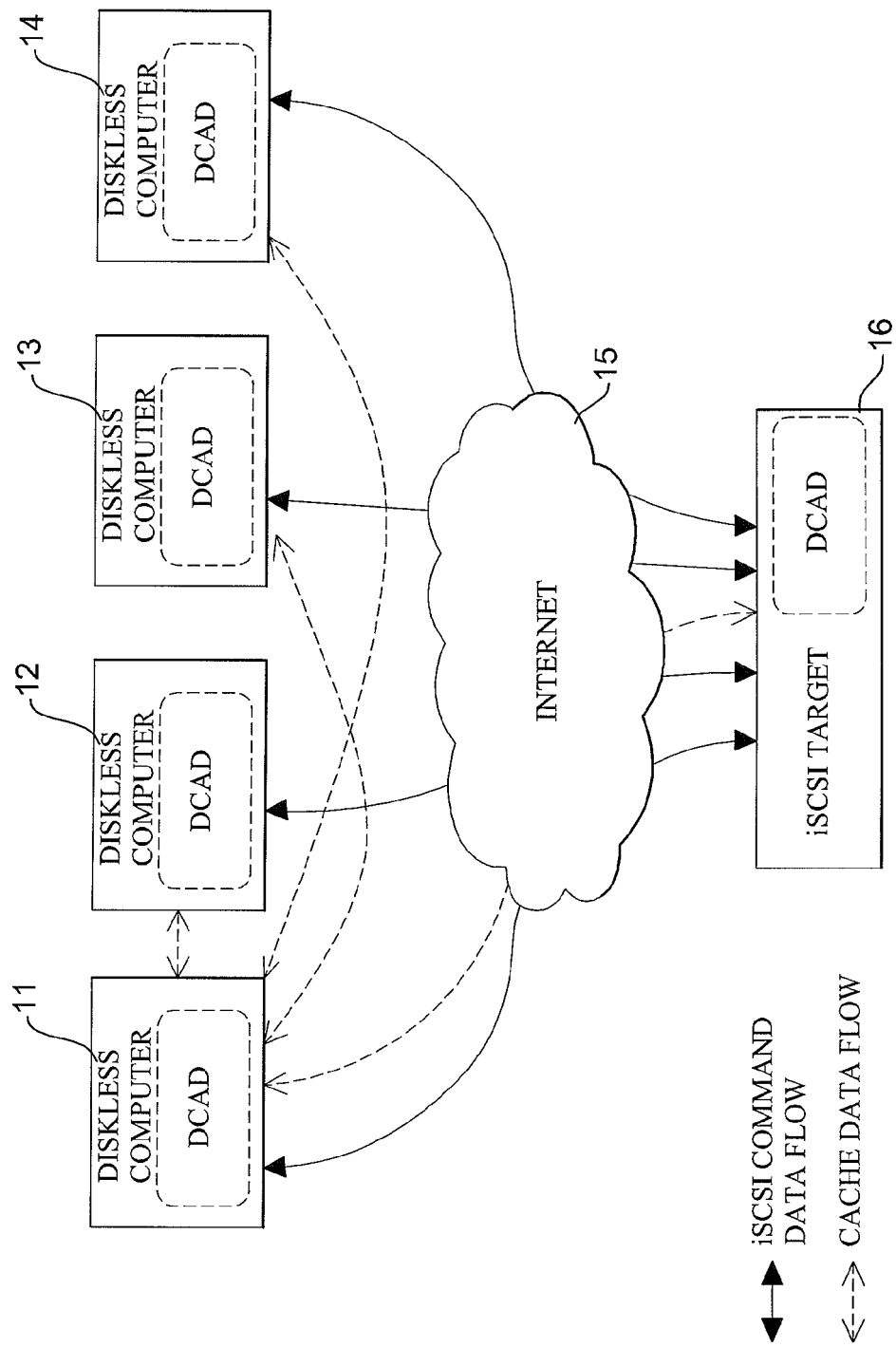
FIG. 1 is a network infrastructure diagram for remotely booting diskless computers having a distributive cache accessing device in accordance with the present invention via a wide area network.

With reference to FIG. 1, a network infrastructure diagram for remotely booting diskless computers having a distributive cache accessing device (DCAD) in accordance with the present invention via a wide area network (WAN) is shown. A WAN-bootable hardware (WBHW) is connected with a personal computer through an add-on card or an adapter to perform remote boot-up. Given the WAN-bootable hardware, the distributive cache accessing device in accordance with the present invention is inserted in a diskless computer so that all distributive cache accessing devices inside the diskless computers (11, 12, 13, 14) can independently and mutually communicate. Hence, the distributive cache accessing devices of the diskless computers (11, 12, 13, 14) and an iSCSI target (16) can mutually share cache accessing data thereof via the internet (15) or a LAN.

The iSCSI target provides a disk space to satisfy the data read and write requests of the diskless computers, and also has a distributive cache accessing device mounted in the iSCSI target to support the aforementioned operational framework and to list information stored to be present or tracked in the operational process.

The WBHW has an embedded system, a network interface module, a remote booting module, an iSCSI module and the aforementioned distributive cache accessing device.

As the distributive cache accessing device supports the iSCSI communication protocol, other distributive cache accessing devices can respond to iSCSI commands for accessing the disk and which are issued by the WBHW. Such distributive cache accessing device can not perform all the functions of the iSCSI target, but provide data already acquired instead. Given one additional write buffer, the distributive cache accessing device then has the functions of the iSCSI target, including handling with disk read and write operations, thereby forming a simplified iSCSI target.

Figure 2:
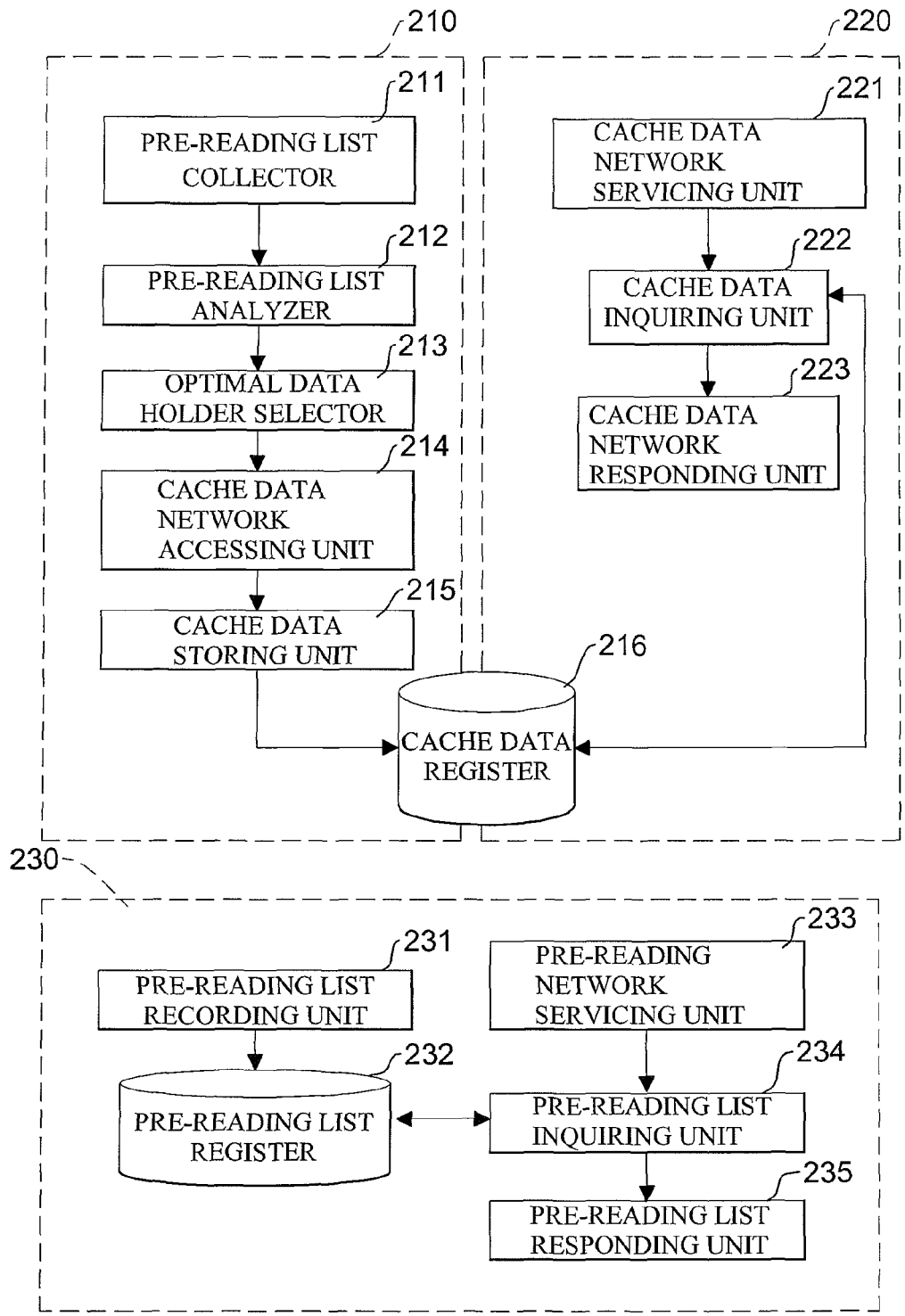
FIG. 2 is a functional block diagram of the distributive cache accessing device in accordance with the present invention.

With reference to FIG. 2, the distributive cache accessing device has a pre-reading list generating and inquiring module (230), a cache sharing module (220) and a multi-link cache pre-reading module (210).

The pre-reading list generating and inquiring module (230) is solely used by the iSCSI target to record the iSCSI request commands issued by diskless computers having the WBHW and the network addresses of the diskless computers, and to generate a pre-reading list for other diskless computers to access via the network. The pre-reading list is available for diskless computers to learn the operating system profile (OSP) beforehand or the disk location required upon executing the application programs, and the diskless computer from which the OSP is accessible. The pre-reading list has an OSP and a who-has-what-list (WHWL).

The OSP is a data structure list recording identical disk-accessing operations for a certain type of application. The detailed content of each data entry in the list has a target disk information, a type of an iSCSI command, an operation address of the iSCSI command, and a data length of the iSCSI command. The pre-reading list is generated by the pre-reading list generating and inquiring module and stored in the iSCSI target (or a certain network server for management purpose). Such information is not only adequate to meet the pre-reading operation, but also analyzes dependence and correlation of data accessed by the commands. For example, when booting or executing application programs, the order of blocks of data to be read can be learned in advance, and addresses of the data blocks to be updated can be learned at the same time to prevent inconsistent data when reading the blocks of data.

The WHWL records data block information already accessed by each diskless computer. The detailed content of each data entry in the WHWL has a network address of a data holder and the OSP identification information associated with data to be accessed. The WHWL is dynamically updated and is stored in the iSCSI target (or a certain network server for management purpose).

The pre-reading generating and inquiring module (230) has a pre-reading list recording unit (231), a pre-reading list register (232), a pre-reading network servicing unit (233), a pre-reading list inquiring unit (234), and a pre-reading list network responding unit (235).

The pre-reading list recording unit (231) generates the OSP and the WHWL by recording, combining and eliminating dependence of received iSCSI commands and detects if a disk containing at least one operating system in the iSCSI target has been updated. If positive, the network address of the first requesting diskless computer is used to filter iSCSI request records. The iSCSI requests issued by the first requesting diskless computer and the disk having the updated operating system in the iSCSI target are recorded only. The written data blocks cannot be pre-read. Otherwise, data requesters may receive inconsistent cache data. Therefore, read commands dependent upon write commands are ignored. Moreover, a plurality of read commands combined into one command reads continuous addresses, not only increasing cache data reading performance but also reducing the number of commands in the OSP.

The pre-reading list register (232) is used to store multiple pre-reading lists. In addition to the pre-reading lists, a hash value (for example: MD5 code) of the OSP and the WHWL is also stored in each pre-reading list for an upgrade check, ensuring consistent cache data across the plurality of diskless computers. If the hash value is inconsistent, it represents that data in the iSCSI target has been updated. Cache data obtained by using the pre-reading list prior to the update are not sharable with other diskless computers having the updated pre-reading lists.

The pre-reading network servicing unit (233) waits for external iSCSI command requests, and receives request packets for OSP and WHWL issued from other diskless computers.

The pre-reading list inquiry unit (234) inquires about the pre-reading list having external command requests from the pre-reading list register (232).

The pre-reading list network responding unit (235) is responsible for replying to inquiry results to requesters, and responding to the pre-reading lists corresponding to the booting operating systems selected by the diskless computers in the request packets for OSP and WHWL together with the hash values to requesters.

The pre-reading list recording unit (231) has a disk update detector (not shown), a request filter (not shown), a dependent data command eraser (not shown) and a continuous data command combiner (not shown).

The disk update detector is used to detect if the disks having operating systems (at the iSCSI target end) are updated. If positive, the pre-reading list recording unit (231) is activated to start recording the iSCSI commands issued by the diskless computers and targeting at the disks having the operating systems.

The request filter may receive a plurality of requests from the diskless computers when the pre-reading list recording unit (231) is activated. The address of a first requester is obtained in accordance with a first received request command. The requests issued by the address are recorded by the pre-reading list recording unit (231) only.

The pre-reading recording unit (231) receives a sequence of iSCSI read and write commands from an identical requester, and the written data blocks are not pre-readable. This ends up with inconsistent cache data received by the data requesters. As a result, the dependent data command eraser needs to delete read commands dependent upon write commands without recording them.

The continuous data command combiner is used to combine a plurality of received read commands to form a command reading data from continuous addresses. Besides augmenting reading efficiency of cache data, total commands in the OSP can be also lowered.

The multi-link cache pre-reading module (210) is executed when booting, learns the disk addresses required to boot or to execute the application programs and the diskless computers from which data is accessible in accordance with the obtained pre-reading list, and simultaneously sends requests for a plurality of cache data blocks to the diskless computers by multiple links. The multi-link cache pre-reading module (210) also provides a function to estimate and select optimal data holders based on the network address and the responding speed of the last request to promptly complete the cache pre-reading task. The obtained cache data blocks are temporarily stored in a cache data register to respond to the requests from other diskless computers.

With reference to FIG. 2, the multi-link cache pre-reading module (210) has a pre-reading list collector (211), a pre-reading list analyzer (212), an optimal data holder selector (213), a cache data network accessing unit (214), a cache data storing unit (215), and a cache data register (216). The cache sharing module (220) has a cache data network servicing unit (221), a cache data inquiring unit (222), and a cache data network responding unit (223).

The pre-reading list collector (211) communicates with the pre-reading list network servicing unit (233) of the iSCSI target, acquires the OSP and the WHWL, and further ascertains the disk addresses for booting or executing the application programs and the diskless computers from which data is accessible.

The pre-reading list analyzer (212) interprets the content of the pre-reading list and generates a sequence of iSCSI commands The optimal data holder selector (213) allocates the iSCSI request commands interpreted by the pre-reading list analyzer (212) to a plurality of optimal data holders based on the conditions of the network address, the current transmission bandwidth, and the previous data responding speed after making a request to the data holder without overloading certain data holders and affecting their operations. As the calculation of an optimal data holder requires extra time, the calculated matching pairs for iSCSI commands and data holders are kept and will not be recalculated until the network environment or the performance of the data holder vary dramatically.

The cache data network accessing unit (214) communicates with the cache data network servicing units (221) of other distributive cache assessing devices to obtain required cache data blocks. The cache data network accessing unit (214) sends a plurality of requests for cache data blocks to the optimal data holders generated by the optimal data holder selector (213) so that multiple iSCSI commands can be retrieved.

The cache data storing unit (215) stores sharable data in the cache data register (216). The cache data is temporarily stored in a storage medium.

The cache data register (216) may be a dynamic random memory or a non-volatile storage medium or disk.

The optimal data holder selector (213) has a network traffic detector (not shown), a load balance scheduler (not shown) and an iSCSI command and a data holder matching register (not shown).

The network traffic detector monitors network traffic and records data responding speed after making a request to data holders.

The load balance scheduler allocates the iSCSI commands in the OSP to a plurality of data holders in accordance with the data responding speed of the data holders, the current network traffic, and the size of the requested cache data. Such an approach accelerates the responding time without overloading data holders and affecting their operation. Moreover, the number of pairs of iSCSI command and data holder is determined by the current network traffic, and the number determines how many iSCSI request commands will be sent out next time. If the network traffic is low, more matching pairs are generated. If the network traffic is high, one or zero matching pair may be generated.

The iSCSI command and data holder matching register temporarily stores the pairs of iSCSI commands and data holders generated by the load balance scheduler.

The cache sharing module (220) is continuously running after power is on to receive a plurality of request commands transmitted from other diskless computers for cache data and to forward the obtained and temporarily stored cache data blocks to the requesters.

The cache data network servicing unit (221) waits for external request commands and simultaneously receives and executes a plurality of iSCSI requests.

The cache data inquiring unit (222) searches for data associated with external commands in the cache data register (216) by first checking if the hash value in the inquiring command is consistent with the hash value in the cache data register. If positive, the data block complying with the iSCSI command is identified in the cache data register. Otherwise, a message of inconsistent cache data is returned.

The cache data network responding unit (223) is responsible for returning the inquiry results of the cache data inquiring unit (222) and forwarding the cache data blocks or messages matching with iSCSI commands to requesters via the network.

Figure 3:
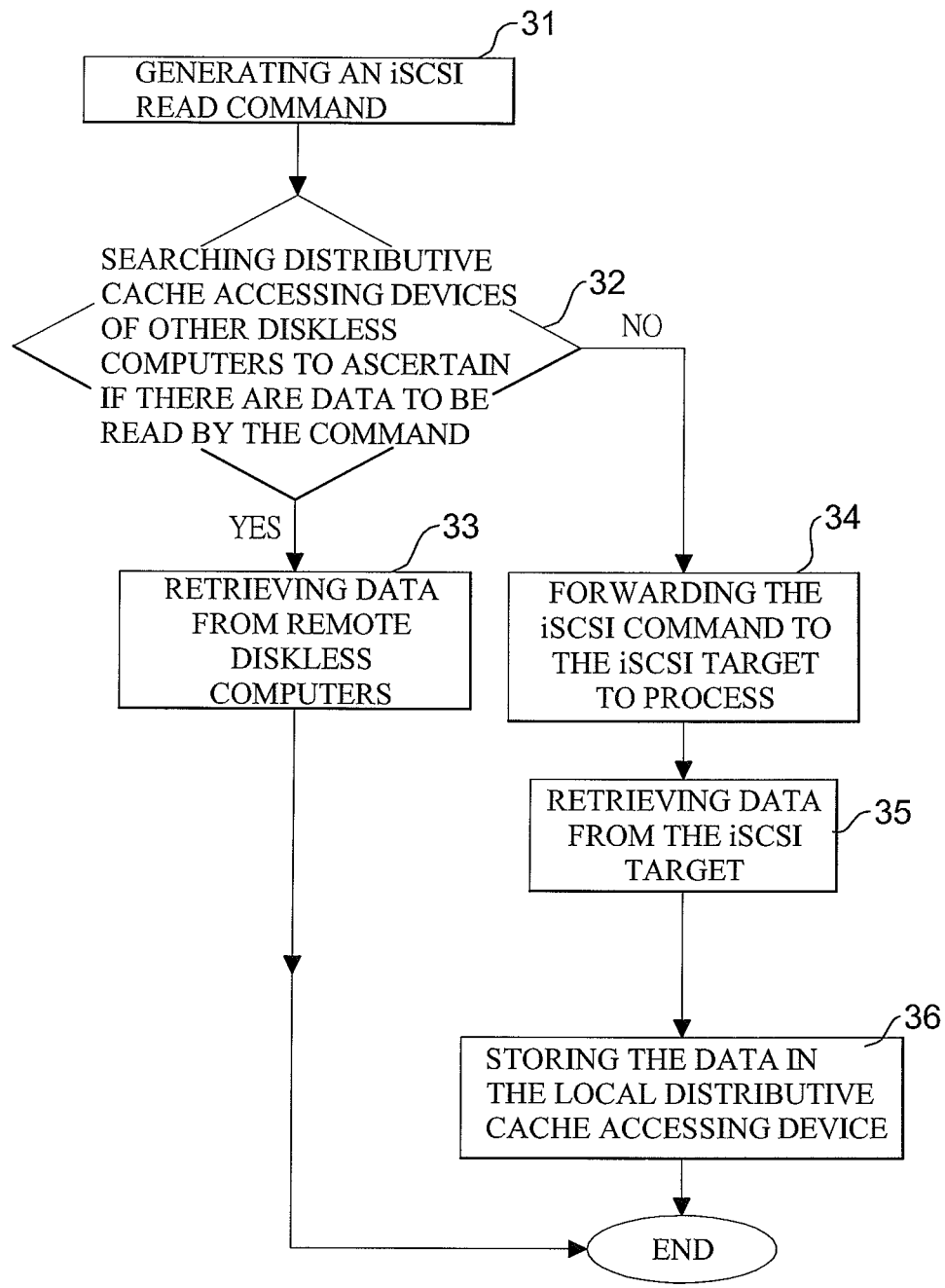
FIG. 3 is an operational flow diagram of a distributive cache accessing method in accordance with the present invention for diskless computers having WAN-bootable hardware.

With reference to FIG. 1, each diskless computer equipped with the distributive cache accessing device is connected to other diskless computers and an iSCSI target to execute the following steps of (with reference to FIG. 3):
generating an iSCSI read command (Step 31);
searching for the distributive cache accessing devices of other diskless computers to ascertain if there is data to be read by the command (Step 32);
if positive, retrieving the data from the other diskless computers (Step 33);
if negative, forwarding the iSCSI command to the iSCSI target to process (Step 34);
retrieving data from the iSCSI target (Step 35); and
storing the data in the local distributive cache accessing device (Step 36).

Figure 4:
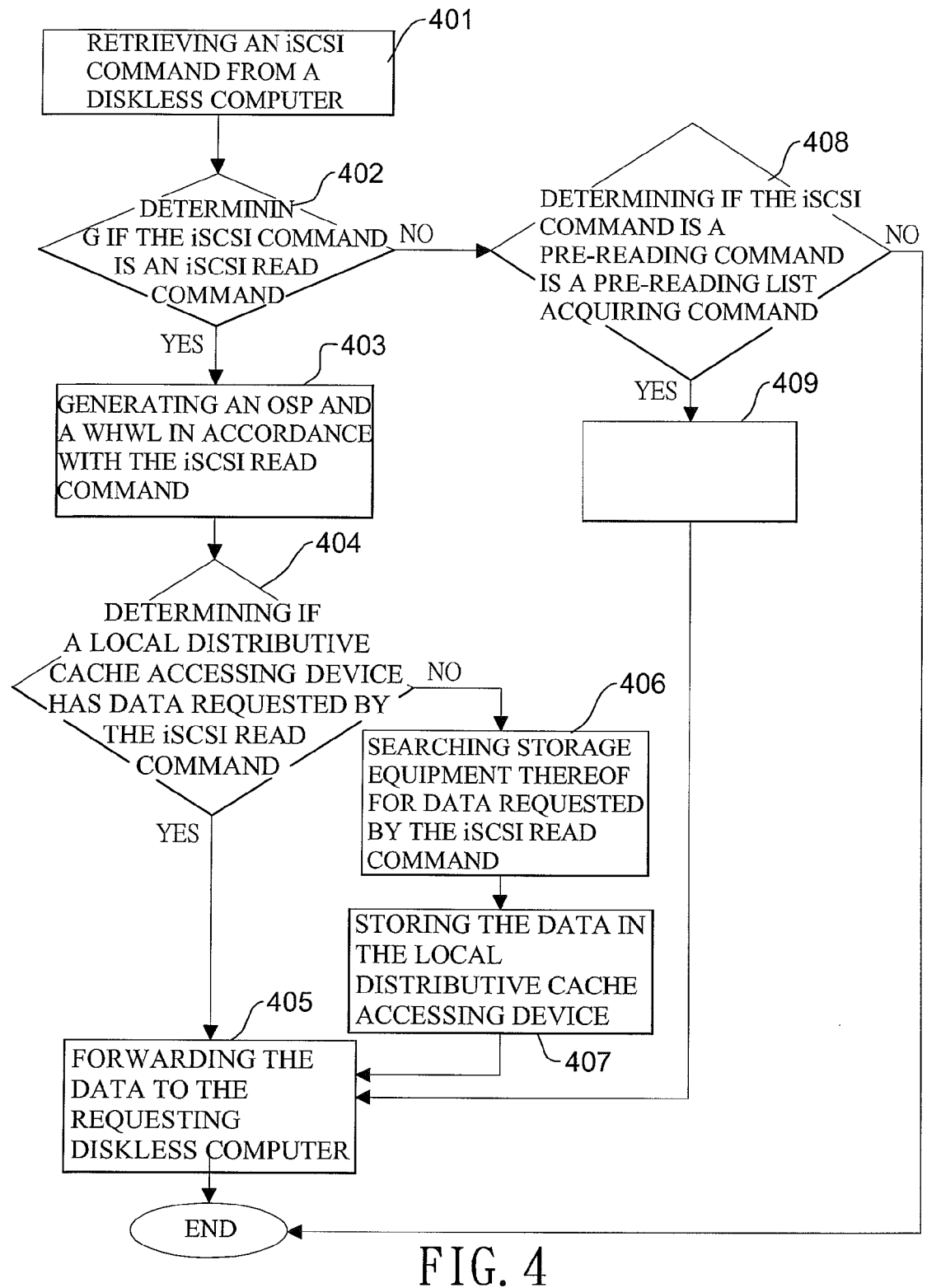
FIG. 4 is an operational flow diagram of the distributive cache accessing method of an iSCSI target in accordance with the present invention.

With further reference to FIG. 1, the iSCSI target also has a distributive cache accessing device and is connected to at least one diskless computer via the network to execute the following steps of (with reference to FIG. 4):
receiving an iSCSI command from a diskless computer (Step 401);
determining if the iSCSI command is an iSCSI read command (Step 402);
if it is an iSCSI read command, generating an OSP and a WHWL in accordance with the iSCSI read command (Step 403);
determining if the local distributive cache accessing device has data requested by the iSCSI read command (Step 404);
if found, forwarding the data to the requesting diskless computer (Step 405);
if not found, searching local storage equipment thereof for data requested by the iSCSI read command (Step 406);
storing the data in the local distributive cache accessing device (Step 407);
if it is not an iSCSI read command, determining if the iSCSI command is a pre-reading list acquiring command (Step 408);
if it is a pre-reading acquiring command, reading a pre-reading list data (Step 409);
forwarding the pre-reading list data to the requesting diskless computer (Step 405); and
if not a pre-reading list acquiring command, neglecting the iSCSI command and terminating.

Accordingly, the present invention temporarily stores partial data of the iSCSI target in the distributive cache accessing devices of other diskless computers. Each distributive cache accessing device can make requests to other distributive cache accessing devices for reading data therefrom. The work load of the iSCSI target (work load and network bandwidth) can be significantly reduced, and the booting speed (or the speed of executing application programs) of diskless computers is also enhanced. As long as there are sufficient booted diskless computers, the booting speed of diskless computers is accelerated. Therefore, the present invention not only accelerates the booting speed of conventional diskless computer when there are a large number of diskless computers present, but also alleviates the work load of the iSCSI target.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A distributive cache accessing device mounted in each of a local diskless computer and a plurality of other diskless computers respectively equipped with a WAN-bootable hardware and in an iSCSI (Internet Small Computer System Interface) target, wherein all the diskless computers and the iSCSI target are mutually connected through a network for accelerating to boot up the distributive cache accessing device, with the distributive cache accessing device comprising:

a multi-link cache accessing pre-reading module acquiring at least one pre-reading list from the iSCSI target, ascertaining data stored in at least one of the plurality of other diskless computers for booting the local diskless computer having the multi-link cache accessing pre-reading module therein and for executing application programs by multi-linking to and sending out a plurality of iSCSI commands from the local diskless computer to the at least one of the plurality of other diskless computers determined as at least one optimal data holder to request for a plurality of cache data blocks from the optimal data holder; and a cache sharing module receiving the plurality of iSCSI commands from the at least one of the plurality of other diskless computers for requesting the plurality of cache data blocks, and transmitting the plurality of cache data blocks in the local diskless computer to the at least one of the plurality of other diskless computers issuing the plurality of iSCSI commands.

2. The device as claimed in claim 1, wherein the device is mounted in the iSCSI target, and further comprises a pre-reading list generating and inquiring module enabling the iSCSI target to record a sequence of iSCSI commands and at least one network address of at least one of the plurality of other diskless computers, and generating the at least one pre-reading list to be accessed by the local diskless computer and the plurality of other diskless computers.

3. The device as claimed in claim 2, wherein the multi-link cache accessing pre-reading module comprises:
   a pre-reading list collector retrieving the at least one pre-reading list for booting and executing the application programs in the at least one of the plurality of other diskless computers through the pre-reading list generating and inquiring module in the iSCSI target;
   a pre-reading list analyzer interpreting contents of the at least one pre-reading list and generating the sequence of iSCSI commands;
   an optimal data holder selector selecting the at least one optimal data holder in accordance with the at least one network address thereof and at least one most recently responding speed of the at least one of the plurality of other diskless computers, and generating at least one of matching data for the sequence of iSCSI commands and the at least one optimal data holder;
   a cache data network accessing unit issuing at least one request for the plurality of cache data blocks in accordance with the at least one pair of matching data generated by the at least one optimal data holder selector with the sequence of iSCSI commands simultaneously executed and responded to by the at least one data holder; and
   a cache data storing unit temporarily storing the plurality of cache data blocks in a storage medium.

4. The device as claimed in claim 1, wherein the cache sharing module comprises:
   a cache data network servicing unit simultaneously receiving and executing the plurality of iSCSI commands;
   a cache data inquiring unit checking if a hash value in one of the received iSCSI commands is consistent with a hash value of the plurality of cache data blocks in the at least one optimal data holder; and
   a cache data network responding unit transmitting the plurality of cache data blocks associated with the one of the received iSCSI commands back to the local diskless computer.

5. The device as claimed in claim 2, wherein the pre-reading list generating and inquiring module comprises:
   a pre-reading list recording unit generating the at least one pre-reading list by recording, combining, and eliminating dependency of the plurality of iSCSI commands, and then calculating a hash value for verifying if the at least one pre-reading list has been updated so that cache data shared among all the diskless computers are consistent;
   a pre-reading list network servicing unit receiving at least one request for the at least one pre-reading list issued by at least one of the plurality of other diskless computers;
   a pre-reading list inquiring unit inquiring about the at least one pre-reading list based on at least one booting operating system selected by the at least one request for the at least one pre-reading list; and
   a pre-reading list responding unit forwarding Rail the at least one pre-reading list and a hash value thereof to the at least one of the plurality of other diskless computer requesting the at least one pre-reading list; and
   a pre-reading list register storing the generated at least one pre-reading list in a storage medium.

6. The device as claimed in claim 1, wherein the at least one pre-reading list comprises:

an OSP (Operating System Profile) having a sequence of iSCSI commands for booting the local diskless computer and executing the application programs, each entry of the OSP having target disk information, a type of one of the plurality of iSCSI commands, an operation address of the iSCSI command, and a length of the iSCSI command and each entry of the OSP is associated with a hash value for verifying if the OSP has been updated; and
a WHWL (Who Has What List) recording ownership information of the plurality of cache data blocks, with each entry of the WHWL having a network address of one of the diskless computers and a set of OSP entries.

7. The device as claimed in claim 2, wherein each one of the at least one pre-reading list comprises:
   an OSP (Operating System Profile) having a sequence of iSCSI commands for booting the local diskless computer and executing the application programs, each entry of the OSP consisting of target disk information, a type of one of the plurality of iSCSI commands, an operation address of the iSCSI command, and a length of the iSCSI command and each entry of the OSP is associated with a hash value for verifying if the OSP has been updated; and
   a WHWL (Who Has What List) recording ownership information of the plurality of cache data blocks, with each entry of the WHWL having a network address of one of the diskless computers and a set of OSP entries.

8. The device as claimed in claim 3, wherein each one of the at least one pre-reading list comprises:
   an OSP having a sequence of iSCSI commands for booting the local diskless computer and executing the application programs, each entry of the OSP consisting of target disk information, a type of one of the plurality of iSCSI commands, an operation address of the iSCSI command, and a length of the iSCSI command and each entry of the OSP is associated with a hash value for verifying if the OSP has been updated; and
   a WHWL recording ownership information of the plurality of cache data blocks, with each entry of the WHWL having a network address of one of the diskless computers and a set of OSP entries.

9. The device as claimed in claim 4, wherein each one of the at least one pre-reading list comprises:
   an OSP having a sequence of iSCSI commands for booting the local diskless computer and executing the application programs, each entry of the OSP consisting of target disk information, a type of one of the plurality of iSCSI commands, an operation address of the iSCSI command, and a length of the iSCSI command and each entry of the OSP is associated with a hash value for verifying if the OSP has been updated; and
   a WHWL recording ownership information of the plurality of cache data blocks, with each entry of the WHWL having a network address of one of the diskless computers and a set of OSP entries.

10. The device as claimed in claim 5, wherein each one of the at least one pre-reading list comprises:
    an OSP having a sequence of iSCSI commands for booting the local diskless computer and executing the application programs, each entry of the OSP consisting of target disk information, a type of one of the plurality of iSCSI commands, an operation address of the iSCSI command, and a length of the iSCSI command and each entry of the OSP is associated with a hash value for verifying if the OSP has been updated; and a WHWL recording ownership information of the plurality of cache data blocks, with each entry of the WHWL having a network address of one of the diskless computers and a set of OSP entries.

11. The device as claimed in claim 3, wherein the storage medium is a dynamic random access memory or a non-volatile disk.

12. The device as claimed in claim 5, wherein the storage medium is a dynamic random access memory or a non-volatile disk.

* * * * *